(12) United States Patent
Dowty et al.

(10) Patent No.: US 12,545,410 B2
(45) Date of Patent: Feb. 10, 2026

(54) POSITION-SENSITIVE CONTROLLER FOR AIRCRAFT SEATING

(71) Applicant: B/E Aerospace, Inc., Winston-Salem, NC (US)

(72) Inventors: Mark B. Dowty, Rural Hall, NC (US); Noah Avram Meltz Weichselbaum, Prairie Village, KS (US); Sam Mecham, Lewisville, NC (US); Nicole Sluder Whyte, Mesa, AZ (US)

(73) Assignee: B/E Aerospace, Inc., Winston-Salem, NC (US)

( * ) Notice: Subject to any disclaimer, the term of this patent is extended or adjusted under 35 U.S.C. 154(b) by 574 days.

(21) Appl. No.: 17/725,717

(22) Filed: Apr. 21, 2022

(65) Prior Publication Data
US 2023/0339614 A1    Oct. 26, 2023

(51) Int. Cl.
   *B64D 11/06* (2006.01)
(52) U.S. Cl.
   CPC ...... *B64D 11/06395* (2014.12); *B64D 11/064* (2014.12)
(58) Field of Classification Search
   CPC ............ B64D 11/06395; B64D 11/064; B60N 2/0233; B60N 2/34
   See application file for complete search history.

(56) References Cited

U.S. PATENT DOCUMENTS

| | | | |
|---|---|---|---|
| 10,773,611 B2 | 9/2020 | Schlosser et al. | |
| 11,136,127 B2 | 10/2021 | Düser et al. | |
| 11,351,892 B1 * | 6/2022 | Roy | B60R 1/062 |
| 2010/0176632 A1 | 7/2010 | Alford et al. | |
| 2015/0137492 A1 | 5/2015 | Rao et al. | |
| 2016/0176337 A1 * | 6/2016 | Kwak | B60Q 3/76 297/217.6 |
| 2017/0015423 A1 * | 1/2017 | Udriste | B60N 2/77 |
| 2018/0356897 A1 * | 12/2018 | Hoggarth | H04N 9/3185 |
| 2020/0164812 A1 * | 5/2020 | Chou | G02B 3/0006 |
| 2020/0339266 A1 | 10/2020 | McMillan | |

FOREIGN PATENT DOCUMENTS

| | | |
|---|---|---|
| CN | 108583373 A | 9/2018 |
| DE | 102005003873 A1 | 8/2006 |
| GB | 2496452 A | 5/2013 |

OTHER PUBLICATIONS

Extended European Search Report dated Aug. 25, 2023; European Application No. 23164584.7.

* cited by examiner

*Primary Examiner* — Jason Holloway
*Assistant Examiner* — Elizabeth Rose Neleski
(74) *Attorney, Agent, or Firm* — Suiter Swantz IP (57) ABSTRACT

An aircraft seat pod with a reclining seat includes a controller interface that extends around a surface of the pod, include a surface obscured by the seat when in an upright position. The controller tracks the position and orientation of the seat and displays seat controls on the interface at a convenient location. More than one interface may be disposed at different locations to conveniently accommodate passengers of different size or in different orientations. Vision sensors may track the position and orientation of a passenger and preemptively display controls at a convenient location.

20 Claims, 6 Drawing Sheets

POSITION-SENSITIVE CONTROLLER FOR AIRCRAFT SEATING

BACKGROUND

Seat controllers are static and disposed in a compromise ergonomic position based on features such as the average passenger size, and seat recline. Some seats use tethered controls to allow for flexible usage. Some seats incorporate multiple separate controls such as a remote PCU to accommodate large passenger position differences (e.g. bed mode). Existing seat controller solutions are primarily limited to flat surfaces. It would be advantageous to have a seat controller that were conveniently useable in a wide variety of applications.

SUMMARY

In one aspect, embodiments of the inventive concepts disclosed herein are directed to an aircraft seat pod with a reclining seat and a controller interface that extends around a surface of the pod, include a surface obscured by the seat when in an upright position. The controller tracks the position and orientation of the seat and displays seat controls on the interface at a convenient location.

In a further aspect, more than one interface is disposed at different locations to conveniently accommodate passengers of different size or in different orientations. Vision sensors may track the position and orientation of a passenger and preemptively display controls at a convenient location.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft seat pod with a reclining seat and a controller interface that extends around a surface of the pod, include a surface obscured by the seat when in an upright position. The controller tracks the position and orientation of the seat and displays seat controls on the interface at a convenient location. More than one interface may be disposed at different locations to conveniently accommodate passengers of different size or in different orientations. Vision sensors may track the position and orientation of a passenger and preemptively display controls at a convenient location.

Figure 1:
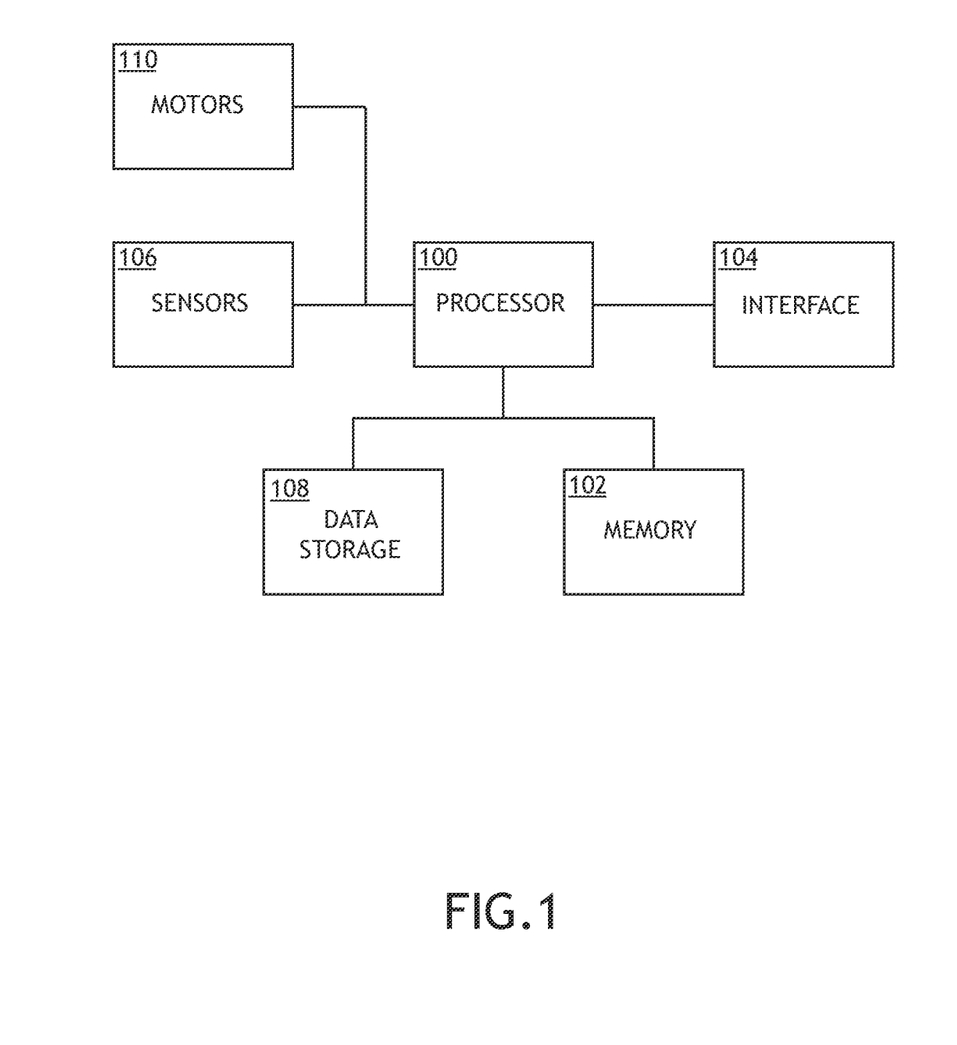
FIG. 1 shows a block diagram of a system for implementing a position sensitive interface according to an exemplary embodiment.

Referring to FIG. 1, a block diagram of a system for implementing a position sensitive interface according to an exemplary embodiment is shown. The system includes a processor 100, memory 102 connected to the processor 100 for embodying processor executable code, and an interface 104. The interface 104 may comprise a touch sensitive display configured to render controls and receive control inputs at any point along the interface 104. Alternatively, or in addition, the interface 104 may be proximity sensing for hand gesturing or motion detection. Furthermore, the display aspect of the interface 104 may include feedback features separate from, or in addition to, rendered images; for example, haptic feedback and/or illuminated visual cues.

In at least one embodiment, the interface 104 defines a primary region including seat controls and a secondary region comprising areas without seta control. When an input is detected in the secondary region, the processor 100 may re-render the primary region focused on the detected input.

In at least one embodiment, the processor 100 is connected to one or more motors 110 and/or actuators to control aspects of a reclining seat or other elements of an aircraft pod. The processor 100 may determine, based on the disposition of the motors 110 or actuators, a current position and/orientation of a reclining seat or other controllable features in the pod. Based on the determined position and orientation, the processor 100 may identify a desirable location for controls on the interface 104, and re-render the controls in that location by default. Alternatively, or in addition, the processor 100 may identify a first contact on the interface 104 corresponding to a control input to a rendered control; while the passenger continues to contact the interface, but the point of contact is shifting (for example, due to the movement of the corresponding reclining seat), the processor 100 may continuously re-render the control on the interface 104 such that a current point of contact always corresponds to the control input of the first contact.

In at least one embodiment, the processor 100 is connected to one or more sensors 106, including vision sensors, and configured to identify a position and/or orientation of a passenger, and render controls on the interface 104 at a location corresponding to that position and/or orientation. For example, when a reclining seat is in a fully reclined mode, the passenger may be lying down and facing either to the passenger's left or right. Sensor's 106 may use head tacking and/or eye tracking algorithms to determine a location of the interface 104 to render controls.

In at least one embodiment, the processor 100 may store specific passenger preferences in a data storage element 108. For example, the processor 100 may store a passenger selected default location for a particular orientation of the reclinable aircraft seat.

In at least one embodiment, the interface 104 comprises electronic components embedded in injection molded components of an aircraft seating area. For example, a polymer injection molded panel may include a display element where the display element electronics are disposed within the injection molded panel. A touch sensitive glass element may be placed over the display element, or a glass or molded plastic element with a capacitive film disposed on an outward facing surface. The electronic components may follow the curvature of the injection molded panel.

Figure 2:
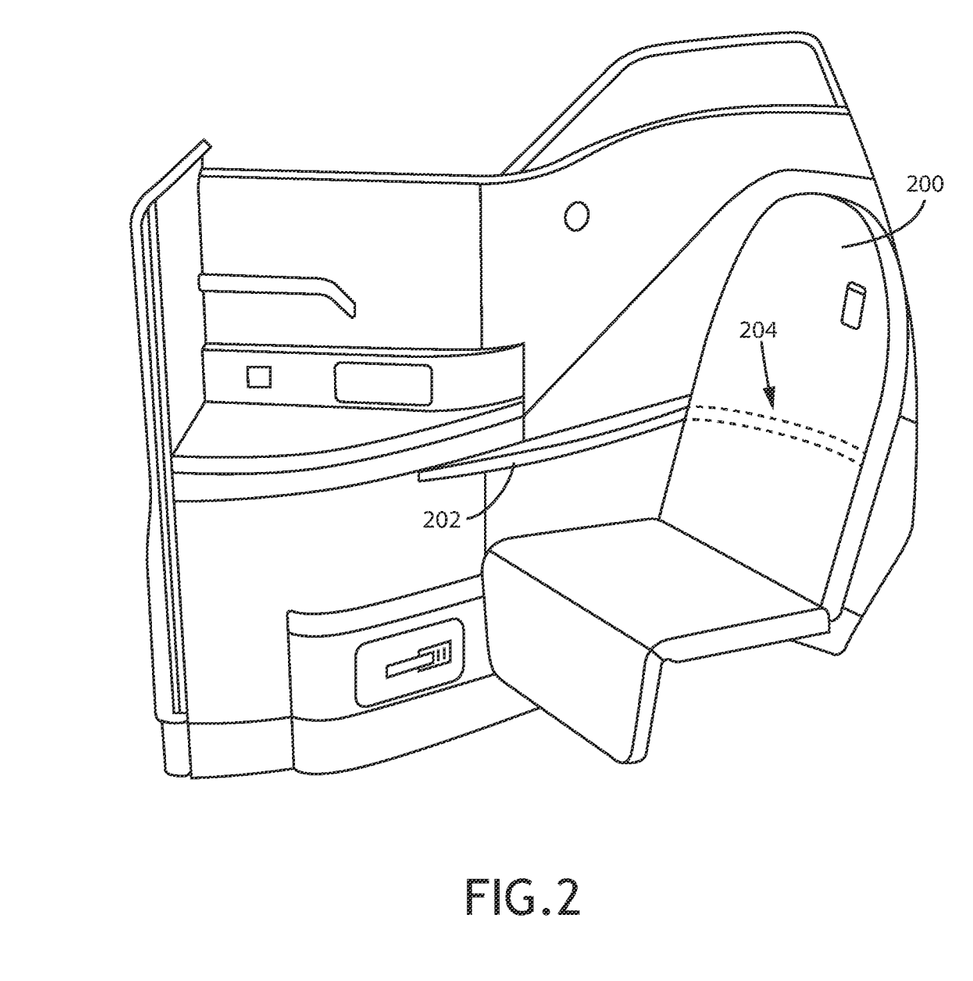
FIG. 2 shows an environmental view of a position sensitive interface according to an exemplary embodiment.

Referring to FIG. 2, an environmental view of a position sensitive interface according to an exemplary embodiment is shown. Where a reclinable aircraft seat 200, or other features, are controllable via an interface 202, 204, the relative position of a passenger to the interface may change as the reclinable aircraft seat 200 reclines. In at least one embodiment, the interface 202, 204 includes a first interface segment 202 that is generally accessible, and a second interface segment 204 that is obscured while the reclinable aircraft seat 200 is in an upright orientation.

When the reclinable aircraft seat 200 is reclined, the second interface segment 204 becomes accessible. In at least one embodiment, the second interface segment 204 may wrap around a curved surface proximal to the reclinable aircraft seat 200. A controller in data communication with the interface 202, 204 may determine the orientation of the reclinable aircraft seat 200 with reference to motors or actuators in data communication with the controller, or with reference to one or more vision sensors.

In at least one embodiment, a controller continuously adjusts a rendering location of controls on the interface 202, 204 according to the continuously changing orientation of the reclinable aircraft seat 200, potentially weighted by stored passenger preference locations, so that the rendered controls are always in a convenient location for the passenger. It may be appreciated that a convenient location for the passenger may be based on the passenger's size, reduced passenger mobility, etc.

Figure 3:
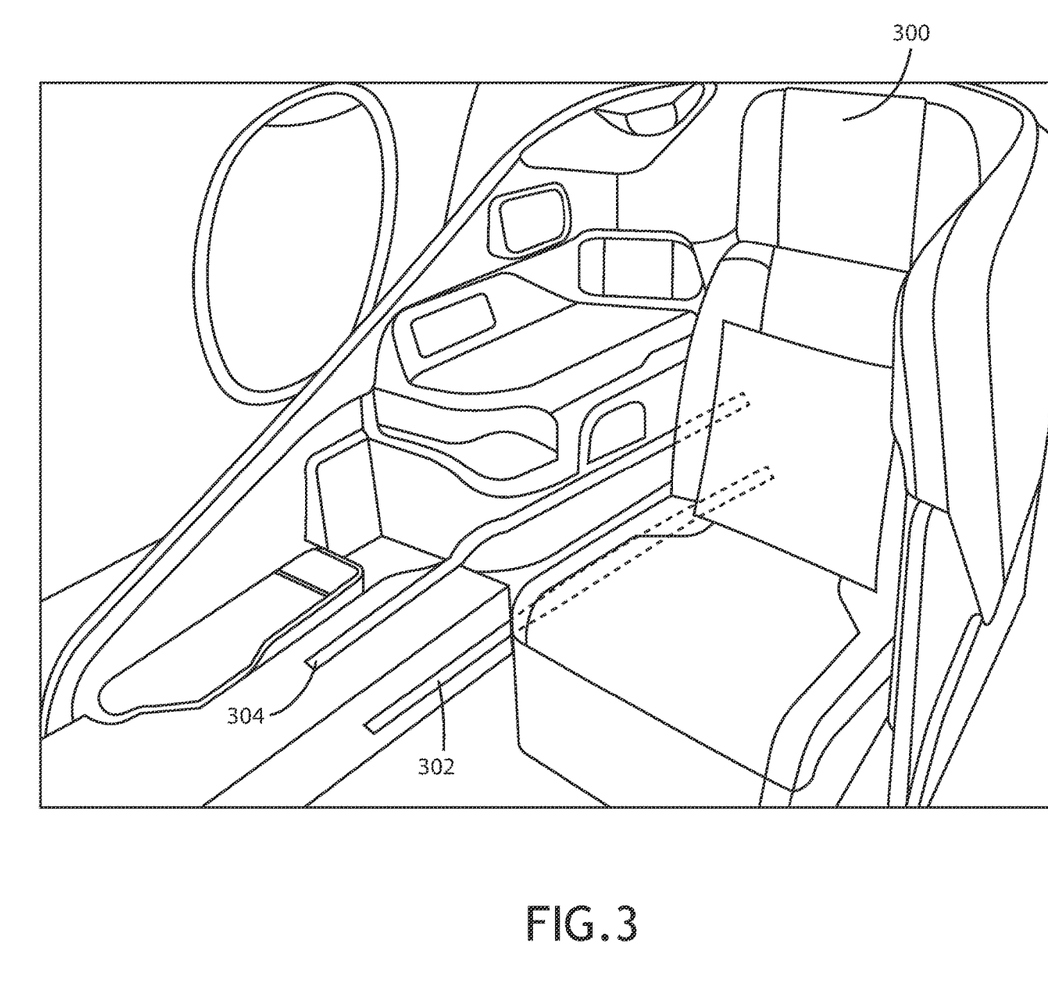
FIG. 3 shows an environmental view of a position sensitive interface according to an exemplary embodiment.

Referring to FIG. 3, an environmental view of a position sensitive interface according to an exemplary embodiment is shown. In at least one embodiment, multiple interfaces 302, 304 may be disposed on surfaces near a reclinable aircraft seat 300. Each interface 302, 304 is configured via processor to render seat controls at various locations on the interfaces 302, 304 based on the disposition and orientation of the reclinable aircraft seat 300, passenger preference, etc.

In at least one embodiment, each interface 302, 304 may be configured and disposed to render specific sets of controls at separate locations based on unique factors or preferences specific to such controls. For example, a first interface 302 may be dedicated to a first set of actuators or features of the reclinable aircraft seat 300 such as a back cushion and headrest, while a second interface 304 may be dedicated to a second set of actuators or features of the reclinable aircraft seat 300 such as a bottom cushion and footrest.

In at least one embodiment, the disposition of the rendered controls on the interfaces 302, 304 are separately determined based on the orientation of the corresponding actuators or features, or by passenger preference, included a previously recorded default preference. For example, in one embodiment, controls may be rendered to keep them within convenient reach of the passenger no matter how the reclinable aircraft seat 300 is oriented. Alternatively, controls may be separately rendered to maintain some dispositional relationship to the portions of the reclinable aircraft seat 300 they control.

Embedded electronics may enable integration of interfaces 302, 304 with 3D electronic HMI surfaces in areas not previously practical. Embedded electronic components integrate circuits into injection molded components.

Figure 4:
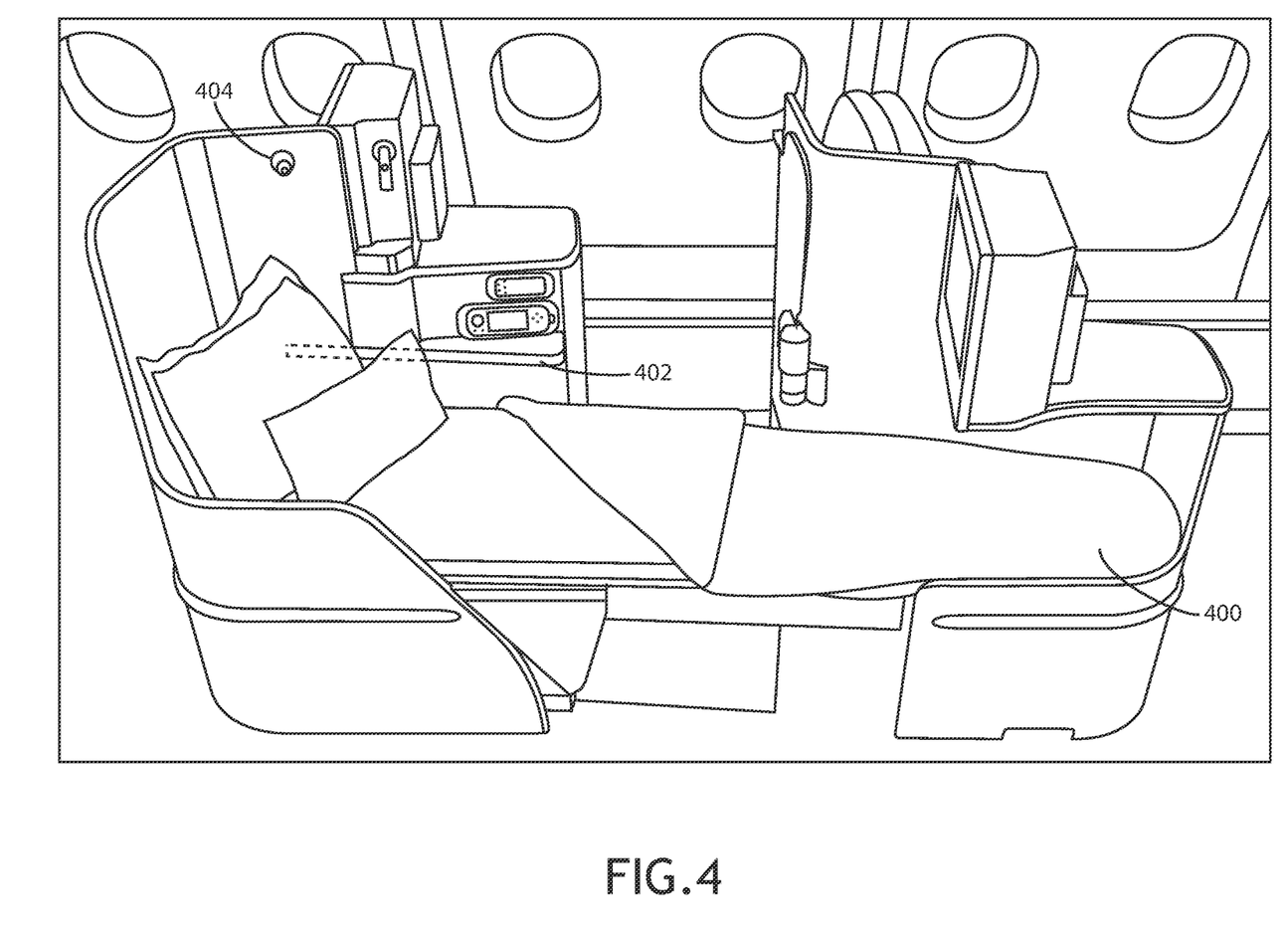
FIG. 4 shows an environmental view of a position sensitive interface according to an exemplary embodiment.

Referring to FIG. 4, an environmental view of a position sensitive interface according to an exemplary embodiment is shown. In at least one embodiment, one or more interfaces 402 are disposed to render controls for actuators or features of a reclinable aircraft seat 400. In addition to the controls for the reclinable aircraft seat 400, the interface 402 may provide controls for the orientation of other features of the seating area or pod such a passenger light or air flow gasper 404.

In at least one embodiment, a processor, configured to render controls at various locations on the interface 402, is also configured to control actuators connected to the other features. Based on the disposition of reclinable aircraft seat 400, the processor maintains those other features in orientations that may be generally convenient for the passenger, such as keeping a reading light focused on a portion of the reclinable aircraft seat 400 as the reclinable aircraft seat 400 shifts from an upright to a reclined orientation.

In at least one embodiment, orientation control of the other features may be relative to a passenger selection. For example, the passenger may manipulate the orientation of an air flow gasper 404 via the interface 402. Then, as the reclinable aircraft seat 400 shifts from an upright to a reclined orientation, the orientation of the air flow gasper 402 may be automatically adjusted according to an algorithm to keep the air flow gasper 404 pointed toward the passenger selected portion of the reclinable aircraft seat 400. Furthermore, the force of the airflow may be automatically adjusted to account for an increasing or decreasing distance between the reclinable aircraft seat 400 and the air flow gasper 404.

In at least one embodiment, where the interface 402 and corresponding processor may control audio and video components within the pod. The processor may adjust aspects of the audio and video components according to the orientation of the reclinable aircraft seat 400.

Figure 5A:
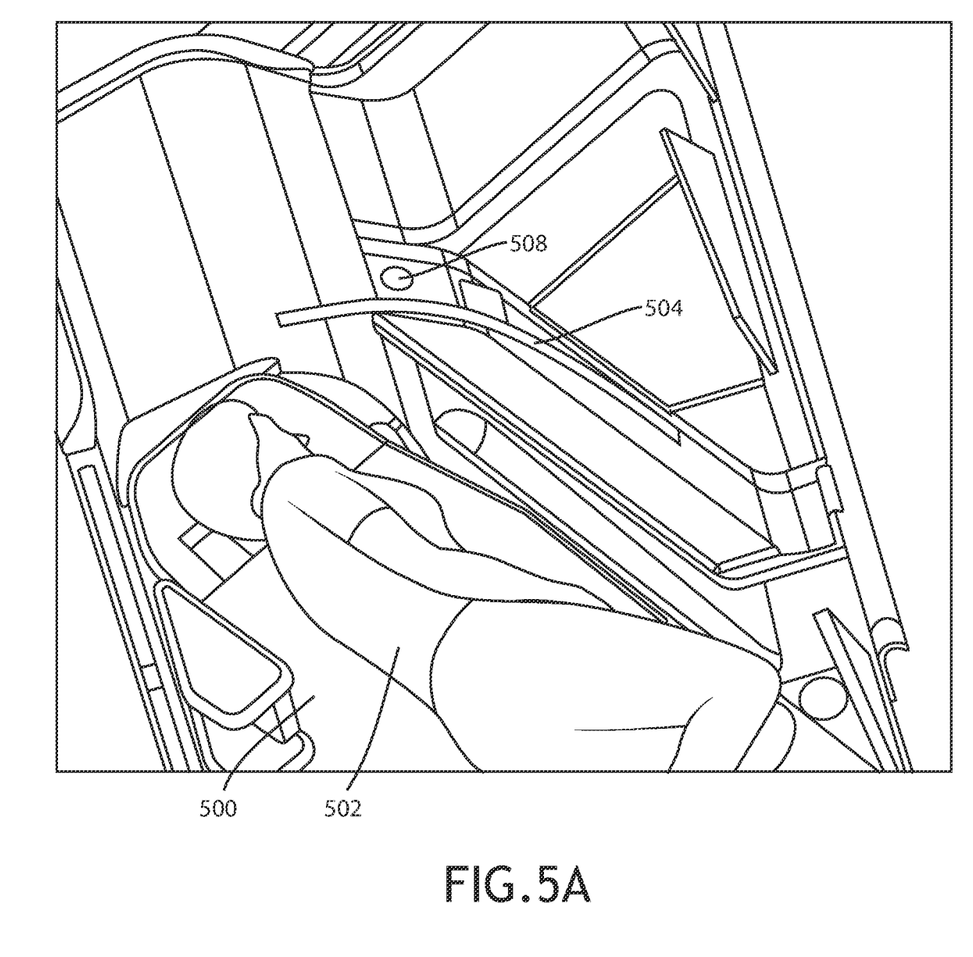
FIG. 5A shows an environmental view of a position sensitive interface according to an exemplary embodiment.
Figure 5B:
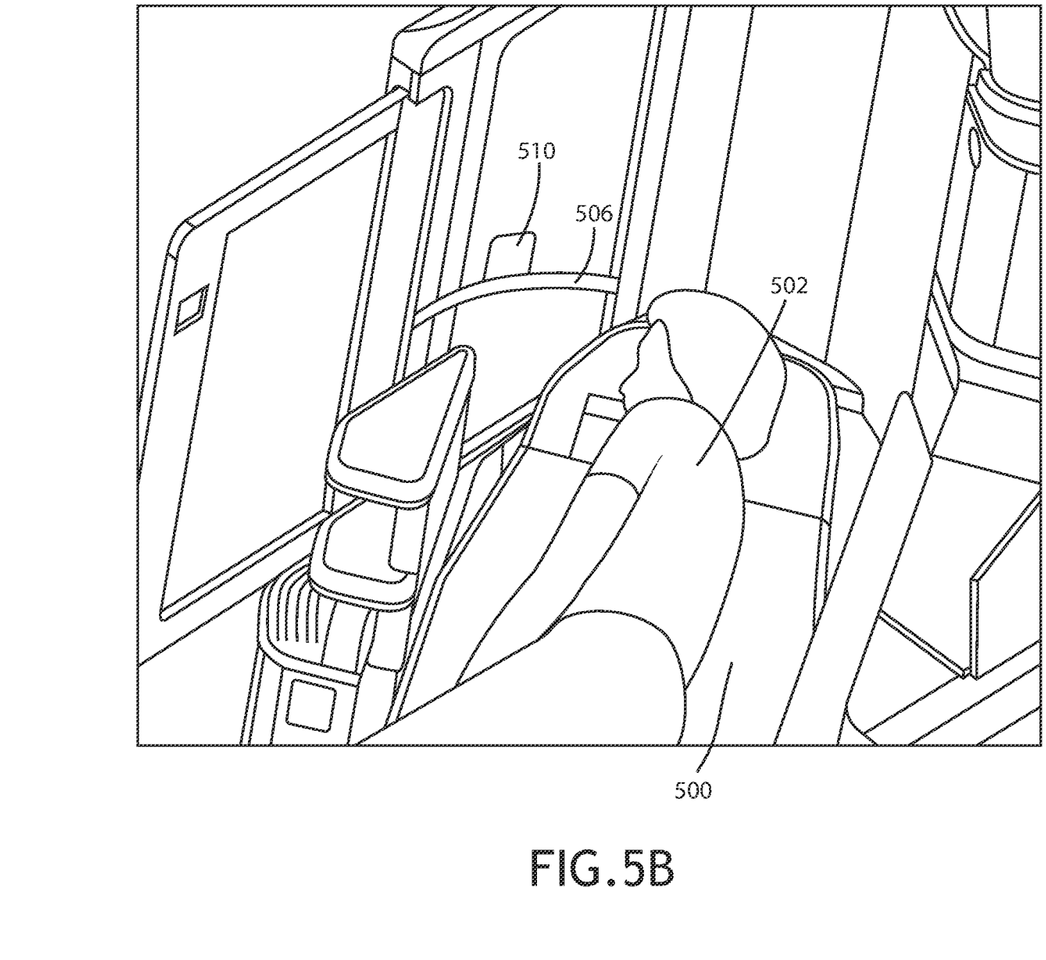
FIG. 5B shows an environmental view of a position sensitive interface according to an exemplary embodiment.

Referring to FIGS. 5A-5B, environmental views of a position sensitive interface according to an exemplary embodiment are shown. In at least one embodiment, a reclinable aircraft seat 500 may lay completely flat and a passenger 502 on their side might face either left or right while lying down. In a pod or semi enclosed seating area, one or more interfaces 504, 506 may be disposed around the reclinable aircraft seat 500 such that at least one interface 504, 506 is disposed on either side of the passenger. Alternatively, a single interface 504, 506 may continuously wrap around the reclinable aircraft seat 500.

In at least one embodiment, one or more vision sensors 508, 510 may be disposed around the reclinable aircraft seat 500. A processor controlling the disposition of controls on the one or more interfaces 504, 506 may identify which direction the passenger 502 is facing based on data from the vision sensors 508, 510. In at least one embodiment, the processor may employ head tracking or eye tracking algorithms to determine which direction the passenger 502 is facing. In at least one embodiment, the processor may further utilize eye tracking to render controls at a location corresponding to the line of sight of the passenger 502.

Embodiments of the present disclosure enable adjustable seating based on the preferred ergonomics of the passenger and accommodate mobility-disadvantaged passengers. Furthermore, embodiments may be utilized anywhere that a passenger interface needs to accommodate various ergonomics and/or passenger location.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A seat control device comprising:
one or more motors;
at least one touch sensitive interface device; and
at least one processor in data communication with the one or more motors, the at least one interface device, and a memory storing processor executable code for configuring the at least one processor to:
render a set of input controls on the interface device;
receive an input from the interface device;
activate at least one of the one or more motors; and
continuously re-render the input controls at different locations on the interface device, such different locations defined by a seat position actuated by the one or more motors, without any direction from a passenger.

2. The seat control device of claim 1, wherein:
the at least one processor is further configured to continuously determine a seat orientation and passenger orientation;
continuously re-rendering the input controls at different locations on the interface device comprises relating the different locations on the touch sensitive interface to one or more of the determined seat orientation and passenger orientation.

3. The seat control device of claim 2, wherein continuously determining the seat orientation comprises tracking a current state of each of the one or more motors and relating each current state to a seat orientation.

4. The seat control device of claim 2, further comprising one or more vision-based sensors, wherein continuously determining the seat orientation comprises:
receiving image data from the one or more vision-based sensors;
identifying one or more landmarks disposed on the seat; and
determining the seat orientation based on a location of each of the one or more landmarks.

5. The seat control device of claim 4, wherein:
the at least one interface device comprises a first interface device disposed on a first surface and a second interface device disposed on a second surface;
the first surface is disposed on an opposite side of the seat as compared to the second surface;
the at least one processor is further configured to:
receive image data from the one or more vision sensors;
determine an orientation of a passenger in the seat; and
determine if the passenger is more closely facing the first surface or the second surface; and
continuously re-rendering the input controls comprises rendering the input controls on the first touch sensitive interface or the second touch sensitive interface based on the determination that the passenger is more closely facing the first surface or the second surface.

6. The seat control device of claim 1, wherein:
at least one of the one or more motors is configured to control an orientation of an air flow gasper; and
the at least one processor is further configured to continuously adjust the at least one motor configured to control the orientation of the air flow gasper based on a defined relationship between the orientation of the air flow gasper and a seat orientation.

7. The seat control device of claim 1, wherein:
at least one of the one or more motors is configured to control an orientation of a light; and
the at least one processor is further configured to continuously adjust the at least one motor configured to control the orientation of the light based on a defined relationship between the orientation of the light and a seat orientation.

8. A method comprising:
rendering a set of input controls on at least one interface device;
receiving an input from the interface device;
activating one or more motors;
continuously tracking a current location of an uninterrupted contact with the interface device;
continuously re-rendering the input controls at different locations on the interface device, such different locations defined by a seat position actuated by the one or more motors, without any direction from a passenger.

9. The method of claim 8,
further comprising continuously determining a seat orientation,
wherein continuously re-rendering the input controls at different locations on the interface device comprises relating the different locations on the touch sensitive interface to the determined seat orientation.

10. The method of claim 9, wherein continuously determining the seat orientation comprises tracking a current state of each of the one or more motors and relating each current state to a seat orientation.

11. The method of claim 9, further comprising receiving image data from one or more vision-based sensors, wherein continuously determining the seat orientation comprises:
identifying one or more landmarks disposed on a seat; and
determining the seat orientation based on a location of each of the one or more landmarks.

12. The method of claim 11, wherein:
the at least one interface device comprises a first interface device disposed on a first surface and a second interface device disposed on a second surface;
the first surface is disposed on an opposite side of the seat as compared to the second surface;
further comprising:
receiving motion or proximity data from one or more motion or proximity sensors corresponding to a movement or proximity of a passenger;
receiving image data from the one or more vision sensors;
determining an orientation of the passenger in the seat based on one or more of the image data and motion or proximity data; and
determining if the passenger is more closely facing the first surface or the second surface; and
wherein continuously re-rendering the input controls comprises rendering the input controls on the first touch sensitive interface or the second touch sensitive interface based on the determination that the passenger is more closely facing the first surface or the second surface.

13. An aircraft seat pod comprising:
one or more injection molded panels;
a reclinable seat;
a plurality of motors, at least one motor configured to control an orientation of the reclinable seat;
at least one interface device; and
at least one processor in data communication with the plurality of motors, the at least one interface device, and a memory storing processor executable code for configuring the at least one processor to:
render a set of input controls on the interface device;
receive an input from the interface device;
activate at least one of the plurality of motors; and
continuously re-render the input controls at different locations on the interface device, such different locations defined by a set position actuated by the one or more motors, without any direction from a passenger,
wherein the at least one interface device is embedded in one of the one or more injection molded panels.

14. The aircraft seat pod of claim 13, wherein:
the at least one processor is further configured to continuously determine an orientation of the reclinable seat;
continuously re-rendering the input controls at different locations on the interface device comprises relating the different locations on the touch sensitive interface to the determined reclinable seat orientation.

15. The aircraft seat pod of claim 14, wherein continuously determining the orientation of the reclinable seat comprises tracking a current state of each of the plurality of motors and relating each current state to the orientation of the reclinable seat.

16. The aircraft seat pod of claim 14, further comprising one or more vision-based sensors, wherein continuously determining the orientation of the reclinable seat comprises:
receiving image data from the one or more vision-based sensors;
identifying one or more landmarks disposed on the reclinable seat; and
determining the orientation of the reclinable seat based on a location of each of the one or more landmarks.

17. The aircraft seat pod of claim 16, wherein:
the at least one interface device comprises a first interface device disposed on a first surface and a second interface device disposed on a second surface;
the first surface is disposed on an opposite side of the reclinable seat as compared to the second surface;
the at least one processor is further configured to:
receiving image data from the one or more vision sensors;
determine an orientation of a passenger in the reclinable seat; and
determine if the passenger is more closely facing the first surface or the second surface; and
continuously re-rendering the input controls comprises rendering the input controls on the first touch sensitive interface or the second touch sensitive interface based on the determination that the passenger is more closely facing the first surface or the second surface.

18. The aircraft seat pod of claim 13, further comprising at least one air flow gasper,
wherein:
at least one of the plurality of motors is configured to control an orientation of the air flow gasper; and
the at least one processor is further configured to continuously adjust the at least one motor configured to control the orientation of the air flow gasper based on a defined relationship between the orientation of the air flow gasper and an orientation of the reclinable seat.

19. The aircraft seat pod of claim 13, further comprising at least one light:
wherein:
at least one of the plurality of motors is configured to control an orientation of the light; and
the at least one processor is further configured to continuously adjust the at least one motor configured to control the orientation of the light based on a defined relationship between the orientation of the light and an orientation of the reclinable seat.

20. The aircraft seat pod of claim 19, further comprising at least one air flow gasper,
wherein:
- at least one of the plurality of motors is configured to control an orientation of the air flow gasper; and
- the at least one processor is further configured to continuously adjust the at least one motor configured to control the orientation of the air flow gasper and light based on a defined relationship between the orientation of the air flow gasper, light, and the orientation of the reclinable seat.

* * * * *